United States Patent
Ron et al.

(10) Patent No.: US 9,639,011 B2
(45) Date of Patent: *May 2, 2017

(54) COLORLESS DIGITAL PRIMER FOR DIGITAL PRINTING

(71) Applicant: Hewlett-Packard Indigo B.V., Amstelveen (NL)

(72) Inventors: Hannoch Ron, Kadima (IL); Inna Tzomik, Modiin (IL); Daniel Skvirsky, Ness Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

This patent is subject to a terminal disclaimer.

(21) Appl. No.: 14/894,078

(22) PCT Filed: Jun. 28, 2013

(86) PCT No.: PCT/EP2013/063679
§ 371 (c)(1),
(2) Date: Nov. 25, 2015

(87) PCT Pub. No.: WO2014/206494
PCT Pub. Date: Dec. 31, 2014

(65) Prior Publication Data
US 2016/0109817 A1    Apr. 21, 2016

(51) Int. Cl.
*G03G 5/00* (2006.01)
*G03G 5/14* (2006.01)
(Continued)

(52) U.S. Cl.
CPC .......... *G03G 5/142* (2013.01); *C09D 11/033* (2013.01); *C09D 11/106* (2013.01); *C09D 11/14* (2013.01);
(Continued)

(58) Field of Classification Search
CPC ...... G03G 5/142; G03G 7/0026; G03G 9/125; C09D 11/033
(Continued)

(56) References Cited

U.S. PATENT DOCUMENTS

2008/0299480 A1    12/2008 Akioka
2008/0311505 A1    12/2008 Akioka
(Continued)

FOREIGN PATENT DOCUMENTS

EP    0214460    3/1987
JP    8006308    1/1996
(Continued)

*Primary Examiner* — Mark A Chapman
(74) *Attorney, Agent, or Firm* — Dierker & Kavanaugh, P.C.

(57) ABSTRACT

A colorless digital primer for digital printing includes a colorless paste. The colorless paste includes a non-polar carrier fluid, and a resin swollen in the non-polar carrier fluid. The resin is present in the paste in an amount ranging from about 20% (w/w) to about 50% (w/w). A solid polar compound is dispersed in the resin. The solid polar compound is selected from the group consisting of a cellulose microcrystalline powder, dextrin, maltose monohydrate, polyacrylic acid, polyvinyl alcohol, a styrene maleic anhydride copolymer, a bismaleimide oligomer, sucrose, sucrose octaacetate, sucrose benzoate, and combinations thereof. The solid polar compound is present in an amount up to 60 wt. % of solids in the colorless paste.

15 Claims, 3 Drawing Sheets

(51) Int. Cl.
- *G03G 7/00* (2006.01)
- *G03G 9/125* (2006.01)
- *G03G 9/13* (2006.01)
- *G03G 9/135* (2006.01)
- *C09D 11/033* (2014.01)
- *C09D 11/106* (2014.01)
- *C09D 11/14* (2006.01)
- *C09D 133/02* (2006.01)
- *G03G 15/10* (2006.01)

(52) U.S. Cl.
CPC ........... *C09D 133/02* (2013.01); *G03G 7/002* (2013.01); *G03G 7/004* (2013.01); *G03G 7/0026* (2013.01); *G03G 7/0033* (2013.01); *G03G 9/125* (2013.01); *G03G 9/13* (2013.01); *G03G 9/131* (2013.01); *G03G 9/132* (2013.01); *G03G 9/135* (2013.01); *G03G 15/10* (2013.01)

(58) Field of Classification Search
USPC .......................................... 430/124.5, 124.52
See application file for complete search history.

(56) References Cited

U.S. PATENT DOCUMENTS

| | | |
|---|---|---|
| 2011/0104441 A1 | 5/2011 | Bhattacharyya |
| 2011/0303113 A1 | 12/2011 | Sarkisian et al. |
| 2012/0123014 A1 | 5/2012 | Chretien et al. |

FOREIGN PATENT DOCUMENTS

| | | |
|---|---|---|
| JP | 2004061816 | 2/2004 |
| WO | WO 00/59733 | 10/2000 |

20 Min.     60 Min.

20 Min.     60 Min.

COLORLESS DIGITAL PRIMER FOR DIGITAL PRINTING

BACKGROUND

The global print market is in the process of transforming from analog printing to digital printing. Inkjet printing and electrophotographic printing are two examples of digital printing techniques. Liquid electrophotographic (LEP) printing is an example of electrophotographic printing that utilizes a liquid toner-based ink as opposed to a dry toner. LEP printing combines the electrostatic image creation of laser printing with the blanket image transfer technology of offset lithography. In one example of LEP printing, an ink image is electrostatically transferred from a photo imaging plate (i.e., photoconductor, photoconductive drum, photoreceptor, etc.) to an intermediate drum or roller, and then is transferred to a desirable medium.

BRIEF DESCRIPTION OF THE DRAWINGS

Features and advantages of examples of the present disclosure will become apparent by reference to the following detailed description and the drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the colorless digital primer disclosed herein may be applied directly on a substrate surface in order to function as an undercoat for any subsequently applied LEP ink(s). The colorless digital primer may be used to prepare a difficult substrate (e.g., polymeric substrate, some paper substrates, etc.) for the subsequent application of the LEP ink(s). The colorless primer improves the durability of the print, for example, against mechanical wear (e.g., peeling). The improved durability may be due, at least in part, to the presence of solid polar compounds and a relatively small amount of a non-polar carrier fluid in the colorless primer. The solid polar compounds reduce the amount of resin that swells with non-polar carrier fluid, in turn reducing the amount of non-polar carrier fluid in, and to be removed from, the printed primer layer. It is believed that the non-polar carrier fluid present on the substrate decreases the interaction between the polar groups on the substrate and the polar groups in the LEP ink(s) printed on the substrate. Reducing the amount of carrier fluid in the printed primer increases the polar interaction between the substrate and the printed primer. Furthermore, the solid polar compounds in the printed primer layer interact with the polar groups of the LEP ink (e.g., acidic groups on the ink resin) and with the polar groups on the substrate. As a result, the effect of the non-polar carrier fluid is diminished, and overall adhesion is improved.

The colorless digital primer disclosed herein includes a colorless paste and a solid polar compound dispersed in the resin of the colorless paste. The colorless primer does not include any colorant materials (e.g., pigments, dyes, etc.). In the examples disclosed herein, the colorless primer may also include a charge adjuvant and a charge director, which impart charges to the primer. The various components of examples of the colorless primer will be described further in reference to FIG. 1, which illustrates an example of a method 100 for making the colorless digital primer.

Figure 1:
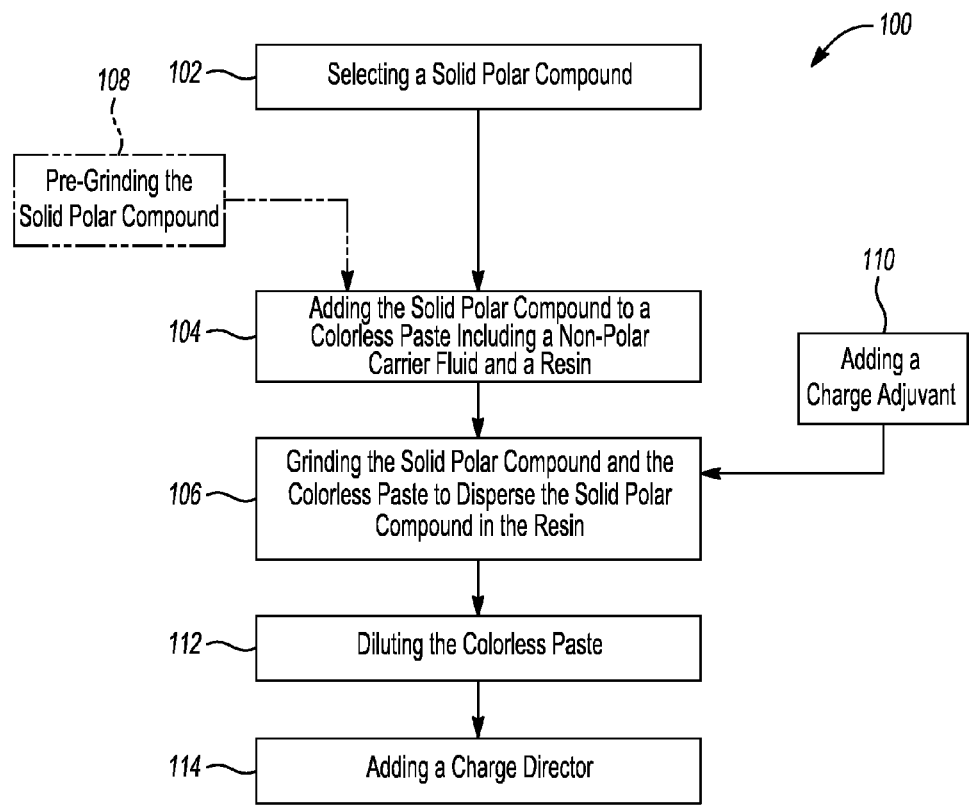
FIG. 1 is a flow diagram illustrating an example of a method of making an example of a colorless digital primer.

Referring now to step 102 of FIG. 1, an example of the method 100 includes selecting a solid polar compound that is suitable for the colorless digital primer. It has been found that a select few solid polar compounds are suitable for use in the colorless digital primer disclosed herein. These solid polar compounds are selected from the following group: a cellulose microcrystalline powder, dextrin, maltose monohydrate, polyacrylic acid, polyvinyl alcohol, a styrene maleic anhydride copolymer, a bismaleimide oligomer, sucrose, sucrose octaacetate, sucrose benzoate, and combinations thereof. Examples of commercially available styrene maleic anhydride copolymers include those from Sartomer Co. USA, LLC, such as SMA® 4000I and SMA® 1000I (i.e., styrene and dimethyl amino propylamine (DMAPA) maleimides) and SMA® 1000P (styrene maleic anhydride resin, cumene end-capped). A suitable example of a bismaleimide oligomer is bis-stearamide.

All of these solid polar compounds contains polar atoms, such as oxygen, nitrogen, etc., that prevent the solid compounds from dissolving or even swelling in the non-polar carrier fluid. As such, the solid polar compounds do not interact with the non-polar carrier fluid, but rather are dispersed in the resin of the colorless paste.

The solid polar compounds are also grindable (i.e., capable of undergoing particle size reduction when exposed to a grinding process). While all of the listed solid polar compounds are grindable, some may be more easily ground than others.

Figure 3:
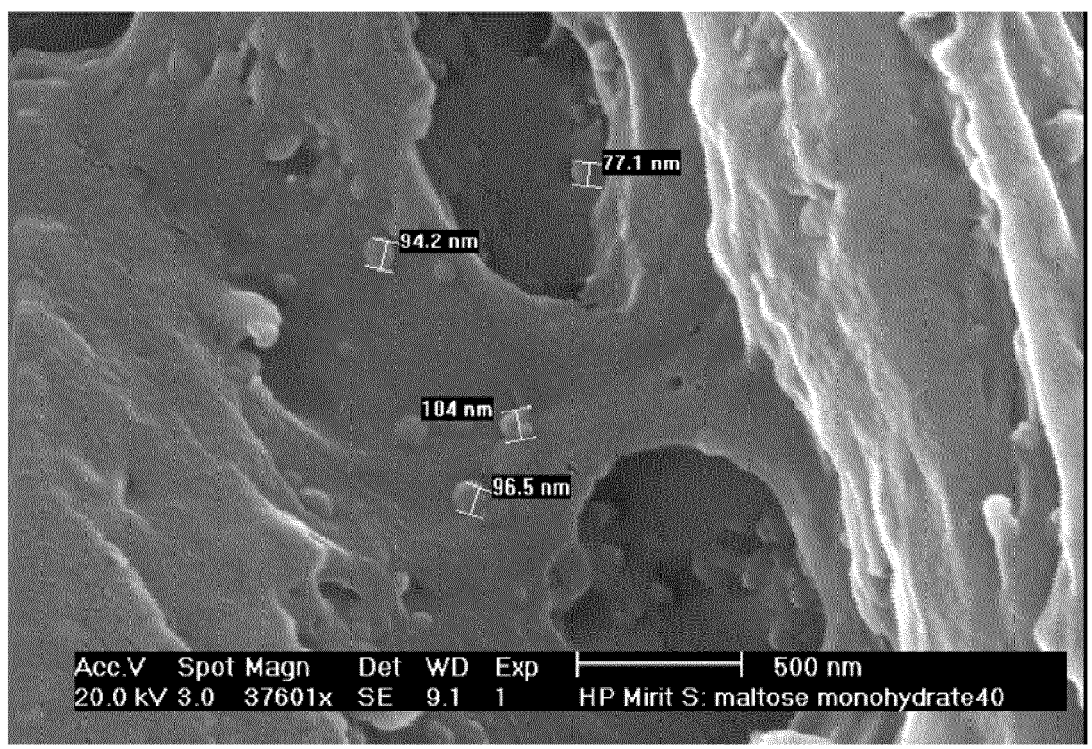
FIG. 3 is a scanning electron microscope (SEM) image of an example of the printed colorless primer including maltose monohydrate dispersed in a colorless paste of ElectroInk 4.5 based on ethylene methacrylic acid copolymers and ethylene acrylic acid copolymers.

A desirable particle size for the solid polar compounds in the colorless primer is on the nanoscale, and ranges from about 30 nm to about 300 nm. In another example, the particle size of the solid polar compounds ranges from about 70 nm to about 130 nm. In still other examples, the desirable particle size for the solid polar compounds in the colorless primer ranges from about 50 nm to about 150 nm. An example of the printed colorless primer having solid polar compounds on the nanoscale is shown in FIG. 3. More particularly, FIG. 3 illustrates a SEM of an example of the colorless primer (including maltose monohydrate and transparent ElectroInk 4.5) disclosed herein after it is printed. As depicted, the particle size of the solid polar compounds is as low as about 77 nm and as high as about 104 nm.

The desired particle size may be achieved during the grinding of the compounds with the colorless paste (reference numeral 106) or may be achieved in a grinding process (reference numeral 108) that is performed prior to adding the solid polar compounds to the colorless paste.

Referring now to step 104 in FIG. 1, the method 100 includes adding the selected solid polar compound to the colorless paste. The colorless paste is a dispersion of a resin swollen in a non-polar carrier fluid.

The non-polar carrier fluid of the colorless paste is an electrical insulator, having a resistivity of at least about $10^9$ ohm-cm. The non-polar carrier fluid may be a hydrocarbon, examples of which include isoparaffinic hydrocarbons, paraffinic hydrocarbons, aliphatic hydrocarbons (e.g., an isomerized aliphatic hydrocarbon, a branched chain aliphatic hydrocarbon, etc.), aromatic hydrocarbons, de-aromatized hydrocarbons, halogenated hydrocarbons, cyclic hydrocarbons, functionalized hydrocarbons, and combinations thereof.

Some examples of the non-polar carrier fluid include ISOPAR® G, ISOPAR® H, ISOPAR® K, ISOPAR® L, ISOPAR® M, ISOPAR® V, NORPAR® 12, NORPAR® 13, NORPAR® 15, EXXOL® D40, EXXOL® D80, EXXOL® D100, EXXOL® D130, and EXXOL® D140, all of which are available from Exxon-Mobil Corp., Houston, Tex. Further examples of the non-polar carrier fluid include Electron, Positron, New II, and Purogen HF (all of which are available from Ecolink Co., Tucker, Ga.). Still further examples of the non-polar carrier fluid include TECLEN® N-16, TECLEN® N-20, TECLEN® N-22, NISSEKI NAPHTHESOL® L, NISSEKI NAPHTHESOL® M, NISSEKI NAPHTHESOL® H, Solvent H, Solvent L, Solvent M, NISSEKI ISOSOL® 300, NISSEKI ISOSOL® 400, AF-4, AF-5, AF-6, and AF-7 (all of which are available from Nippon Oil Corp., Tokyo, JP); IP Solvent 1620 and IP Solvent 2028 (both of which are available from Idemitsu Petrochemical Co., Ltd., Tokyo, JP); and AMSCO® OMS and AMSCO® 460 (both of which are available from American Mineral Spirits Co., Los Angeles, Calif.).

The resin in the colorless paste may be any solid polymer that is able to swell in the selected non-polar carrier fluid. By swelling, it is meant that the resin is capable of increasing in size as a result of accumulation of the non-polar carrier fluid. The resin selected is also able to emit the carrier fluid when phase separation is initiated (e.g., when the swollen resin is exposed to heat at a temperature ranging from about 50° C. to about 80° C., for example, during printing). Examples of the swellable resin include ethylene acrylic acid copolymers and/or ethylene methacrylic acid copolymers. Both ethylene acrylic acid copolymers and ethylene methacrylic acid copolymers are commercially available under the tradename NUCREL® from E. I. du Pont de Nemours and Company, Wilmington, Del. The swelling of these types of resins may be due, at least in part, to the molecular structure similarity between the ethylene-based resin(s) and the non-polar carrier fluid. It is to be understood that any other homopolymer or copolymer that is capable of swelling in the non-polar carrier fluid and is also capable of releasing the non-polar carrier fluid when exposed to suitable heat conditions may also be used.

The resin(s) may be mixed with the non-polar carrier fluid, and the mixture may be exposed to heating while stirring to induce swelling. The temperatures used during mixing may vary depending upon the type of resin. In an example, the temperature ranges from about 120° C. to about 200° C. After heating, the resin(s) in the non-polar carrier fluid may be cooled while stirring is continued. When the resin(s) is/are swollen in the non-polar carrier fluid, the resulting dispersion is the colorless paste. In an example, the resin(s) makes up from about 20% (w/w) to about 50% (w/w) of the colorless paste. The remainder of the colorless paste includes the non-polar carrier fluid, some of which is present in the swollen resin and some of which is present as free carrier (i.e., liquid that is not swollen in the resin(s)).

The colorless paste may include other additives, such as derivatives of polytetrafluoroethylene (PTFE) and polyethylene wax. These additives do not swell in the non-polar carrier fluid. These additives may be included in the colorless paste in an amount ranging from about 1 wt. % to about 20 wt. % of the total wt. %.

As mentioned above, step 104 in FIG. 1 illustrates adding the solid polar compound to the colorless paste. The solid polar compound may be added in any amount up to 60 wt. % of total solids in the colorless paste. In an example, the amount of the solid polar compound that is added ranges from about 10 wt. % of total solids to about 60 wt. % of total solids in the colorless paste. The inclusion of the solid polar compounds reduces the amount of the resin that becomes swollen with the non-polar carrier fluid.

Prior to adding the solid polar compounds to the colorless paste, the solid polar compounds may be pre-ground (reference numeral 108) in order to achieve the desired particle size. Whether or not the solid polar compounds are pre-ground to the desirable size, after the solid polar compounds are added to the colorless paste, the mixture is ground, as shown at reference numeral 106. This process disperses the solid polar compounds throughout the resin of the colorless paste, and, as noted above, may also (further) reduce the particle size of the solid polar compounds.

The grinding process shown at reference numeral 106 involves milling the mixture of the colorless paste and the solid polar compounds. Milling may be accomplished in any suitable mixing apparatus, such as an attritor.

Grinding/milling is accomplished using suitable conditions (e.g., speed, temperature, etc.) for a suitable time to disperse the solid polar compounds in the resin of the colorless paste. In an example, the speed may be about 250 rpm and the temperature may range from about 25° C. to about 40° C. In one example, grinding may be accomplished for about 12 hours to about 48 hours. This process causes the solid polar compounds to disperse throughout the resin, thereby occupying area(s) within the resin that may otherwise become swollen with the non-polar carrier fluid. In some instances, this process also causes the solid polar compounds to deagglomerate into discrete particles. For instance, during milling, the solid polar compound agglomerates may break up into discrete particles, which have an average particle size ranging from about 30 nm to about 300 nm.

During the grinding/milling process, the particle size may be monitored, e.g., via dynamic light scattering (DLS). After the grinding/milling process, the particle size may be determined using a Malvern particle size analyzer. The particle size of the solid polar compounds in the applied film/layer may also be determined using scanning electron microscopy (SEM) (see, for example, FIG. 3).

As shown at reference numeral 110, a charge adjuvant may be added to the mixture during the grinding process. This causes the charge adjuvant to become part of the swollen resin(s), by virtue of chemical bonding or physical association.

In one example, the charge adjuvant includes a base moiety that binds to the acidic groups of the resin(s). The charge adjuvant also provides a molecular structure to trap charge director molecules around the resin(s). For example, the charge adjuvant may include an electron donating moiety (e.g., a Lewis base or an organo-Lewis base) that interacts with a negative charge director to enhance the negative charge. In this example, the donor charge adjuvant is believed to enhance the binding and/or activation of the charge director and thus increase the negative conductivity of the colorless digital primer.

Examples of the donor charge adjuvant include metallic soaps containing a metal, such as Al, Zn, Ca, Mg, Y, other metals, and combinations thereof, and a ligand, such as stearate, oleate, palmitate, other ligands, and combinations thereof. Examples of metallic soaps include aluminum tristearate, aluminum distearate, polyoxo aluminum stearate (POAS), polyoxo aluminum palmitate, oxo-aluminum acrylates, Y(III) stearate, or any other metallic salt whose leaving group is capable of dissolving in the non-polar carrier fluid.

In another example, the charge adjuvant includes an acidic moiety that binds to the basic groups of the resin(s). The charge adjuvant also provides a molecular structure to trap charge director molecules around the resin(s) and/or solid polar compound(s). For example, the charge adjuvant may include an electron accepting moiety (e.g., a Lewis acid) that interacts with a positive charge director to enhance the positive charge. In this example, the acceptor charge adjuvant is believed to enhance the binding and/or activation of the charge director and thus increase the positive conductivity of the colorless digital primer.

Examples of the acceptor charge adjuvant have the formula $X_n(R^a)(R^b)$ or $X_n(R^a)(R^b)(COOH)$ where X is F, Cl, Br, $NO_2$ or CN; $R^a$ is a substituted or unsubstituted alkyl group; $R^b$ is Sb, P, Ti, Sn, B, Al, Zn, or an aromatic group; and n is 1, 2, 3, 4 or 5. One example of the acceptor charge adjuvant has the formula $Cl_n(R^a)(R^b)(COOH)$, where $R^a$ is a substituted or unsubstituted alkyl group having 3, 4 or 5 carbon atoms, $R^b$ is a benzene or a phenol group, and n is 1 or 2. Another example of the acceptor charge adjuvant is a chlorobenzene based compound, such as $Cl(R^a)(R^b)(COOH)$, where $R^a$ is an alkyl group having 5 carbon atoms and $R^b$ is a benzene group. Still another example of the acceptor charge adjuvant has $Cl_2(R^a)(R^b)(COOH)$, where $R^a$ is an alkyl group having 4 carbon atoms and $R^b$ is a phenol group. Still other examples this charge adjuvant include chloro-phenyl carboxylic acid, 2-(4-chlorophenyl)-3-methylbutyric acid, and 4-(2,4-dichlorophenoxy)butyric acid.

The term "alkyl" as used in the examples of the acceptor charge adjuvant means a branched, unbranched or cyclic saturated hydrocarbon group, which may contain from 1 to 20 carbon atoms. Alkyls include, for example, methyl, ethyl, n-propyl, isopropyl, n-butyl, isobutyl, t-butyl, octyl, and decyl, as well as cycloalkyl groups, such as cyclopentyl, and cyclohexyl. The alkyl may be a lower alkyl group, which includes from 1 to 8 carbon atoms. In some examples, $R^a$ is a substituted alkyl group or a heteroalkyl alkyl group. As used herein, the term "substituted alkyl" means an alkyl substituted with one or more substituent groups; and the term "heteroalkyl" means an alkyl in which at least one carbon atom is replaced with a heteroatom.

A suitable amount of the charge adjuvant ranges from about 0.05 wt % to about 8 wt % of the total solids present in the colorless paste.

During grinding, it is to be understood that grinding aids may also be added.

As shown at reference numeral 112, the colorless paste (which is in a concentrated form having a solids content ranging from 20% (w/w) to less than 100% (w/w)) is diluted so that the solids content ranges from 1% (w/w) to 5% (w/w). In an example, the ground mixture is supplied to a machine (e.g., an ink tank of an LEP printer) in the concentrated form. Additional non-polar carrier fluid is added to dilute the mixture to the desired solids content.

Referring now to reference numeral 114, a charge director is then added to the diluted mixture of the colorless paste, the solid polar compounds, and the charge adjuvant to form the colorless digital primer. Generally, charge director(s) are components that induce and/or increase the charge of liquid electrophotographic inks. In the examples disclosed herein, the charge directors can induce and/or increase the charge of the colorless primer. It is believed that the charge director can physically associate with the charge adjuvant (which is included (dispersed) in LEP ink particles or, in the examples disclosed herein, the swollen resin including the solid polar compounds). The selected charge director(s) may form a micelle (or a reverse micelle) structure.

As will be discussed further below, LEP printers include a photoconductive surface which may be charged either positively or negatively. The charge director imparts a charge to the LEP ink and/or colorless primer which is identical to the charge of the photoconductive surface. For example, if the photoconductive surface is charged negatively, then a negative charge director may be used, and if the photoconductive surface is positively charged, then a positive charge director may be used.

Examples of negative charge directors include organic multi-valent metal surfactant salts. These organic salts are soluble in the non-polar carrier fluid, for example, at room temperature. In one example, the organic multi-valent metal salt includes polyvalent metal ions, and organic anions as the counterion. Examples of suitable metal ions include Ba(II), Ca(II), Mn(II), Zn(II), Zr(IV), Cu(II), Al(III), Cr(III), Fe(II), Fe(III), Sb(III), Bi(III), Co(II), La(III), Pb(II), Mg(II), Mo(III), Ni(II), Ag(I), Sr(II), Sn(IV), V(V), Y(III), Ta(V), and Ti(IV). Examples of suitable organic anions include carboxylates or sulfonates derived from aliphatic or aromatic carboxylic or sulfonic acids. Other negative charge directors include polyisobutylene succinimide polyamines (an example of which includes OLOA®1200, available from Chevron Oronite). Still other examples of the negative charge director include metal salts of fatty acids (e.g., calcium palmitate); metal salts of sulfo-succinates; metal salts of oxyphosphates; metal salts of alkyl-benzenesulfonic acid; metal salts of aromatic carboxylic acids or sulfonic acids; metal salts of naphthenic acid (e.g., barium petronate); polyoxyethylated alkylamines; lecithin; polyvinyl-pyrrolidone; and/or organic acid esters of polyvalent alcohols. While several examples are provided, it is to be understood that other negative charge directors may also be utilized in the examples disclosed herein.

Examples of positive charge directors include the organic multi-valent metal surfactant salts and the polyisobutylene succinimide polyamines previously discussed. As specific examples, the positive charge director may be a transition metal salt of a fatty acid, such as aluminum stearate, or a transition metal salt of naphthenic acid, such as cobalt naphthanate. Still other specific examples of positive charge directors include manganese naphthenate, manganese octoate, zirconium octoate, cobalt octoate, iron naphthenate, magnesium octoate, titanium(IV)2-ethyl-1,3 hexanediolate, titanium(IV)-2-ethylhexyloxide, zirconium(IV)-ter-butoxide, tantalum(V)-butoxide, poly-oxo-aluminum tristearate, zinc naphthenate, barium distearate and calcium stearate. In one example, the positive charge director is zirconium(IV) octoate or 2-ethyl hexanoate. In another example, the positive charge director is zirconium(IV) 2-ethyl hexanoate (i.e., ZZ11). While several examples are provided, it is to be understood that other positive charge directors may also be utilized in the examples disclosed herein.

A suitable amount of the charge director depends on the type of resin(s) and/or solid polar compound(s). In an example, the amount of charge director added to the diluted colorless primer ranges from about 10 mg per g of total solids to about 150 mg per g of total solids (from about 1 wt. % to about 15 wt. % of the total solids present in the diluted colorless primer).

Once the colorless digital primer is made, it may be applied (digitally and in a selective manner) as a film/layer directly on a substrate surface so that it acts as a primer for any subsequently applied LEP ink(s). Examples of the LEP ink(s) include any commercially available LEP ink (e.g., ElectroInk available from HP Indigo), and examples of the substrate include coated and uncoated papers. Examples include UPM Finesse (135 g/m$^2$) from UPM Kymi Paper and Pulp Mill, Multifine 130 g/m$^2$, which is an uncoated paper from StoraEnso, or polymeric (bi-oriented polypropylene) BOPP 38 micron corona treated paper.

Figure 2:
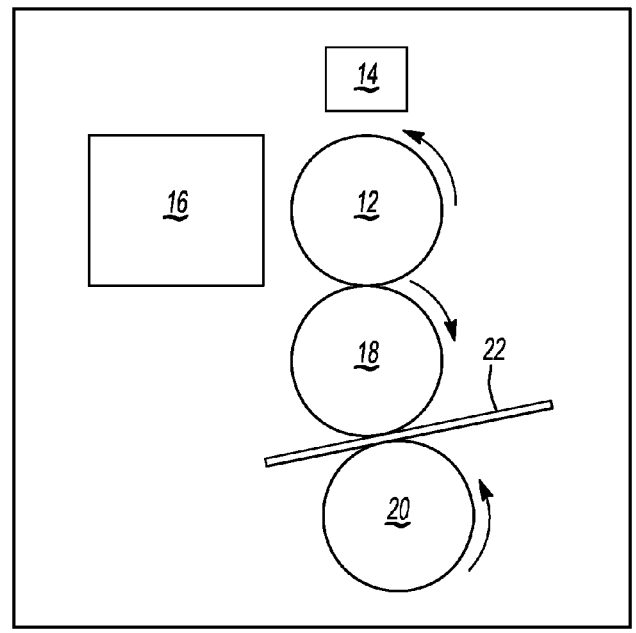
FIG. 2 is a schematic diagram of a liquid electrophotographic printing system for printing examples of the colorless digital primer disclosed herein.

The colorless primer may be applied/printed using any liquid electrophotographic (LEP) digital printing press. A schematic illustration of an LEP digital printing press is shown in FIG. 2. As illustrated, the LEP digital printing press 10 includes a photoconductive drum 12 (including the previously mentioned photoconductive surface), a laser source 14, a binary ink development (BID) unit 16, a blanket drum 18, and an impression cylinder 20. While not shown, it is to be understood that the colorless digital primer (in the concentrated form, i.e., prior to dilution) may be stored in an ink tank (not shown), where the previously described dilution and charging steps may take place.

When printing the colorless digital primer disclosed herein, a latent image is formed on the photoconductive drum 12 using the laser source 14. In an example, it may be desirable to apply the colorless digital primer on the entire surface of the medium 22, and thus the latent image may be the shape of the medium 22 used. In another example, it may be desirable to apply the colorless digital primer on only those portions of the medium 22 that will ultimately have LEP ink applied thereon, and thus the latent image may be the desirable shape for the final printed image. The laser source 14 selectively discharges the photoconductive drum 12 to generate the latent image.

In an example, the BID unit 16 applies the colorless digital primer from the ink tank (not shown), and the colorless digital primer accumulates on a developer roller (which is part of the BID unit). More particularly, the developer roller accumulates the colorless digital primer solids to form a charged paste-like layer. This charged paste-like layer is compacted, for example, by a squeegee. The charged paste-like layer on the developer roller of the BID unit 16 supplies the colorless digital primer to the photoconductive drum 12, where the charged paste-like layer accumulates on the imaged areas (i.e., the latent image) alone of the photoconductive drum 12. In other words, the charged colorless digital primer is attracted to the discharged area(s), while the charged area(s) of the photoconductive drum 12 repel the charged colorless digital primer (creating a clean background). Any of the paste-like layer remaining on the developer roller after transfer to the photoconductive drum 12 may be removed, for example, by a cleaning roller.

The paste-like layer (in the form of the latent image) on the photoconductive drum 12 is then transferred to the blanket drum 18. A medium 22 is directed between the blanket drum 18 and the impression cylinder 20, and the paste-like layer on the blanket drum 18 is transferred to the medium 22 to form the desired primer film/layer directly on the surface of the medium 22.

In the example printing method described above, it is to be understood that LEP ink(s) may be printed in a similar manner after the application of the colorless digital primer layer.

In another example printing method, the LEP ink(s) and the colorless digital primer are applied to the medium 22 at the same time. In this example, the LEP ink and the colorless digital primer are accumulated together on the blanket drum 18 and are transferred to the medium 22 together. In this example, since the colorless digital primer is an underlayer, it is accumulated on the blanket drum 18 above the accumulated LEP ink so that when transferred to the medium 22, the colorless digital primer layer serves as the primer or underlayer.

Any number of layers of the colorless digital primer may be printed. It is desirable that the colorless digital primer remain transparent after its application. In an example, one thin layer (e.g., about 1 μm thick) of the colorless digital primer is transparent. Printing more than four of these thin layers may introduce some level of opaqueness. In order to avoid this, the refractive index of the colorless paste and the solid polar compounds may be matched when preparing the colorless digital primer. By matching, it is meant that the refractive index of each of the colorless paste and the solid polar compounds is within the range of 1.03 to 2.05. In an example, the refractive index of the colorless paste is 1.53 and the refractive index of the solid polar compounds is 1.53±1. When the refractive indices are matched, the printed colorless digital primer remains transparent, even when multiple layers are printed.

To further illustrate the present disclosure, an example is given herein. It is to be understood that this example is provided for illustrative purposes and is not to be construed as limiting the scope of the present disclosure.

EXAMPLE

An example of the colorless digital primer disclosed herein was prepared. The colorless digital primer included 38.5 wt. % of HP ElectroInk 4.5 colorless paste (based on ethylene methacrylic acid copolymers and ethylene acrylic acid copolymers), 60 wt. % of polyacrylic acid, and 1.5 wt. % aluminum stearate. These components were ground in an attritor at 25° C. for 24 hours. Using an HP Indigo 5000 series printing system, the ground mixture was diluted with additional non-polar carrier fluid to a solids content ranging from about 2% (w/w) to about 3% (w/w). The colorless primer was charged by adding a charge director (Imaging Agent from HP).

A bi-oriented polypropylene (BOPP) 38 μm film was treated by corona (400 W), cut and glued on top of a paper substrate (Condat digital gloss 135 gr. from Condat, France). This medium was introduced into the HP indigo 5000 printing system. For the sample, the colorless digital primer of this Example was printed on half of the medium, and then a cyan ink layer was printed thereon. For the comparative sample, the cyan ink layer alone was printed on the other half of the medium that did not include the colorless primer.

Figure 4A:
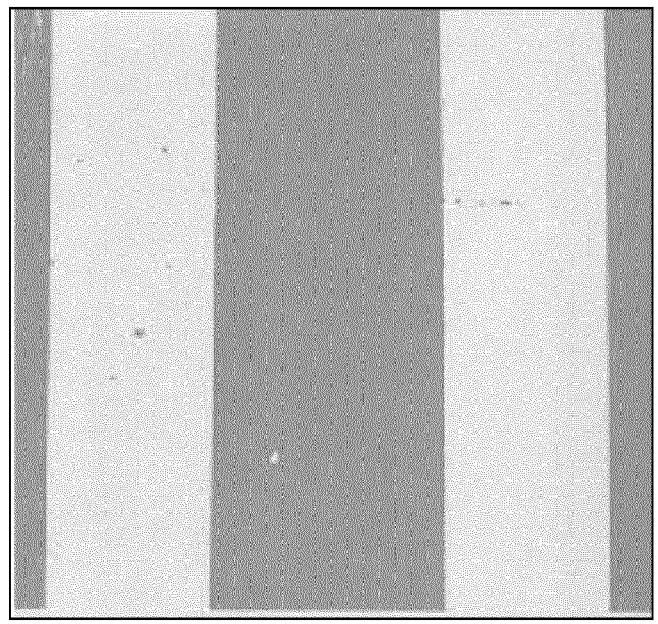
FIGS. 4A and 4B are black and white representations of color photographs of LEP prints exposed to a peeling test at different times after printing, where the respective LEP prints included i) a cyan LEP ink alone (FIG. 4A) and ii) the cyan ink printed on an example of the colorless digital primer according to the present disclosure (FIG. 4B).
Figure 4B:
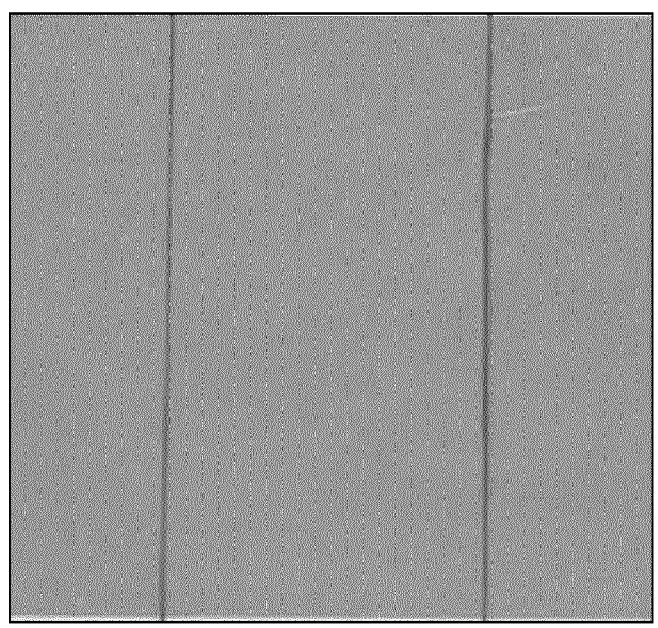

Peeling tests were performed (according to FINAT test method FTM 21 Test Method No. 21) by adhering tape (3M SCOTCH® Magic Tape #810) to the surface of the comparative image and the example image using a 2 kg rubber coated roller. The tape was then removed from the respective images at 20 minutes after printing and at 60 minutes after printing. FIGS. 4A and 4B are black and white representations of color photographs of the test results. As depicted, the ink was peeled off from the non-primed medium (FIG. 4A)

while the ink remained in place on the side of the medium primed with the colorless primer (FIG. 4B).

This Example demonstrates that a BOPP medium primed with a layer of the colorless digital primer prior to ink application improves adhesion significantly.

While the results are not shown, similar peeling test results were obtained when other difficult paper substrates, such as UPM Finesse 135 gr./m2 from UPM, Kymi Paper and Pulp Mill, and Multifine 130 gr./m2 from StoraEnso, were tested in a similar manner (i.e., ½ primed with a second colorless digital primer and the other ½ unprimed). As noted, a second colorless digital primer was used to test the UPM Finesse and Multifine substrates. The second colorless digital primer included 58.5 wt. % of HP ElectroInk 4.5 colorless paste, 40 wt. % of maltose monohydrate or polyacrylic acid, and 1.5 wt. % aluminum stearate. These components were ground in an attritor at 25° C. for 24 hours. Using an HP Indigo 5000 series printing system, the ground mixture was diluted with additional non-polar carrier fluid to a solids content ranging from about 2% (w/w) to about 3% (w/w). The second colorless digital primer was charged by adding a charge director (Imaging Agent from HP).

For these additional samples, the second colorless digital primer was printed on half of the UPM Finesse and Multifine paper substrates, and then a cyan ink layer was printed thereon. For the additional comparative samples, the cyan ink layer alone was printed on the other half of the UPM Finesse and Multifine paper substrates that did not include the second colorless digital primer.

For the peeling tests involving the additional samples and the additional comparative samples (i.e,. those made with the second colorless digital primer and the UPM Finesse and Multifine paper substrates, tape (3M SCOTCH® Magic Tape #230) was adhered to the surface of the additional samples and comparative samples using a 1 kg rubber coated roller. The tape was then removed from the additional samples and the additional comparative samples at 10 minutes after printing. Both of the additional comparative samples exhibited peeling, and both of the additional samples (including the cyan ink layer printed on the second colorless digital primer) remained substantially intact.

It is to be understood that the ranges provided herein include the stated range and any value or sub-range within the stated range. For example, a range from about 30 nm to about 300 nm should be interpreted to include not only the explicitly recited limits of about 30 nm to about 300 nm, but also to include individual values, such as 75 nm, 150 nm, 111.5 nm, 225 nm, etc., and sub-ranges, such as from about 100 nm to about 250 nm, from about 75 nm to about 200 nm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

What is claimed is:

1. A digital method for priming a substrate for subsequently receiving liquid electrophotographic (LEP) ink, the digital method comprising:
    selecting a colorless primer, including:
        a resin swollen with a non-polar carrier fluid;
        a solid polar compound dispersed in the swollen resin, the solid polar compound being selected from the group consisting of a cellulose microcrystalline powder, dextrin, maltose monohydrate, polyacrylic acid, polyvinyl alcohol, a styrene maleic anhydride copolymer, a bismaleimide oligomer, sucrose, sucrose octaacetate, sucrose benzoate, and combinations thereof;
        a charge adjuvant; and
        additional non-polar carrier fluid present in an amount such that a total solids content of the colorless primer ranges from about 1% (w/w) to about 5% (w/w); and
    applying the colorless primer directly to a surface of the substrate.

2. The digital method as defined in claim 1 wherein the styrene maleic anhydride copolymer is selected from i) styrene maleic anhydride resin, cumene end-capped and ii) a copolymer of styrene and dimethyl amino propylamine maleimide.

3. The digital method as defined in claim 1, further comprising selecting the substrate from the group consisting of corona treated polymeric (bi-oriented polypropylene), a coated paper, and an uncoated paper.

4. The digital method as defined in claim 1 wherein the applying of the colorless primer is accomplished using liquid electrophotographic printing.

5. The digital method as defined in claim 1 wherein the selected colorless primer further includes a charge director.

6. The digital method as defined in claim 1 wherein the selected colorless primer includes:
    an isoparaffinic hydrocarbon as the non-polar carrier fluid;
    any of an ethylene methacrylic copolymer or an ethylene acrylic copolymer as the resin;
    the polyacrylic acid as the solid polar compound; and
    aluminum stearate as the charge adjuvant.

7. A colorless digital primer, comprising:
    a colorless paste, including:
    a non-polar carrier fluid; and
    a resin swollen in the non-polar carrier fluid, the resin present in the paste in an amount ranging from about 20% (w/w) to about 50% (w/w); and
    a solid polar compound dispersed in the resin, the solid polar compound being selected from the group consisting of a cellulose microcrystalline powder, dextrin, maltose monohydrate, polyacrylic acid, polyvinyl alcohol, a styrene maleic anhydride copolymer, a bismaleimide oligomer, sucrose, sucrose octaacetate, sucrose benzoate, and combinations thereof, and the solid polar compound being present in an amount up to 60 wt. % of solids in the colorless paste.

8. The colorless digital primer as defined in claim 7 wherein the colorless digital primer is in a concentrated form having a total solids content ranging from about 20% (w/w) to less than 100% (w/w).

9. The colorless digital primer as defined in claim 7, further comprising additional non-polar carrier fluid so that a total solids content in the colorless primer ranges from about 1% (w/w) to about 5% (w/w).

10. The colorless digital primer as defined in claim 7 wherein the styrene maleic anhydride copolymer is selected from i) styrene maleic anhydride resin, cumene end-capped and ii) a copolymer of styrene and dimethyl amino propylamine maleimide.

11. A method of making a colorless digital primer, comprising:
   selecting a solid polar compound from the group consisting of a cellulose microcrystalline powder, dextrin, maltose monohydrate, polyacrylic acid, polyvinyl alcohol, a styrene maleic anhydride copolymer, a bismaleimide oligomer, sucrose, sucrose octaacetate, sucrose benzoate, and combinations thereof;
   adding the solid polar compound to a colorless paste including a non-polar carrier fluid and a resin; and
   grinding the solid polar compound and the colorless paste to disperse the solid polar compound in the resin of the colorless paste.

12. The method as defined in claim 11 wherein selecting the solid polar compound includes selecting the styrene maleic anhydride copolymer from i) styrene maleic anhydride resin, cumene end-capped, and ii) a copolymer of styrene and dimethyl amino propylamine maleimide.

13. The method as defined in claim 11, further comprising pre-grinding the solid polar compound to reduce a particle size of the solid polar compound to be within a range of about 30 nm to about 300 nm.

14. The method as defined in claim 11, further comprising:
   adding a charge adjuvant during the grinding;
   diluting the colorless paste with additional non-polar carrier fluid; and
   adding a charge director after the grinding and the diluting.

15. The method as defined in claim 11 wherein the grinding is accomplished at a temperature ranging from about 25° C. to about 40° C. for a time ranging from about 12 hours to about 48 hours.

* * * * *